(12) United States Patent
Yokota

(10) Patent No.: US 8,885,598 B2
(45) Date of Patent: *Nov. 11, 2014

(54) RADIO TERMINAL AND COMMUNICATION TERMINAL

(75) Inventor: Tomoyoshi Yokota, Yokohama (JP)

(73) Assignee: Kyocera Corporation, Kyoto (JP)

( * ) Notice: Subject to any disclaimer, the term of this patent is extended or adjusted under 35 U.S.C. 154(b) by 1032 days.

This patent is subject to a terminal disclaimer.

(21) Appl. No.: 12/503,767

(22) Filed: Jul. 15, 2009

(65) Prior Publication Data

US 2010/0172321 A1 Jul. 8, 2010

(30) Foreign Application Priority Data

Jul. 15, 2008 (JP) ................................. 2008-184340

(51) Int. Cl.
- *H04W 4/00* (2009.01)
- *H04W 36/00* (2009.01)
- *H04W 36/02* (2009.01)

(52) U.S. Cl.
CPC .......... *H04W 36/02* (2013.01); *H04W 36/0016* (2013.01)
USPC ......................................... 370/331; 370/338

(58) Field of Classification Search
USPC ....................................................... 370/331
See application file for complete search history.

(56) References Cited

U.S. PATENT DOCUMENTS

| 2006/0077994 A1* | 4/2006 | Spindola et al. ............... 370/412 |
| 2006/0240828 A1* | 10/2006 | Jain et al. ...................... 455/436 |
| 2007/0076662 A1* | 4/2007 | Jain et al. ...................... 370/331 |

FOREIGN PATENT DOCUMENTS

JP 2008-141266 6/2008

* cited by examiner

*Primary Examiner* — Brandon Renner
(74) *Attorney, Agent, or Firm* — Duane Morris LLP

(57) ABSTRACT

A radio terminal 10 includes a radio communication unit 11 configured to receive packets at predetermined intervals through a first network 100 or a second network 200, a buffer 15 configured to temporarily store packets received by the radio communication unit 11, another radio communication unit 11 configured to transmit a preparation request for handover from the first network 100 to the second network 200, and an application processor 16 configured to reproduce the packets stored in the buffer 15 at a predetermined rate determined according to the predetermined interval. The application processor 16 stops the adaptive buffer control in response to the transmission of the handover preparation request.

10 Claims, 11 Drawing Sheets

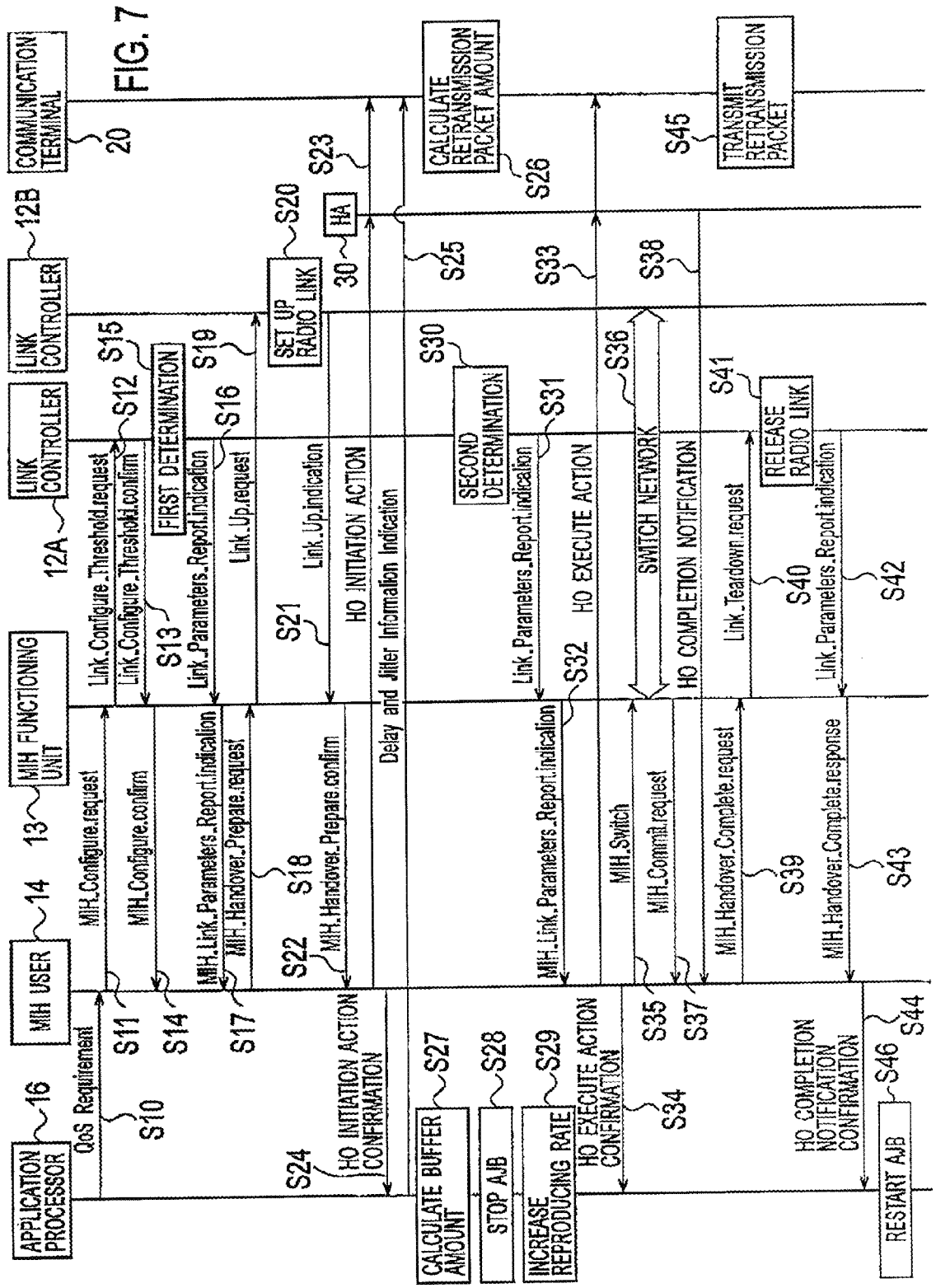

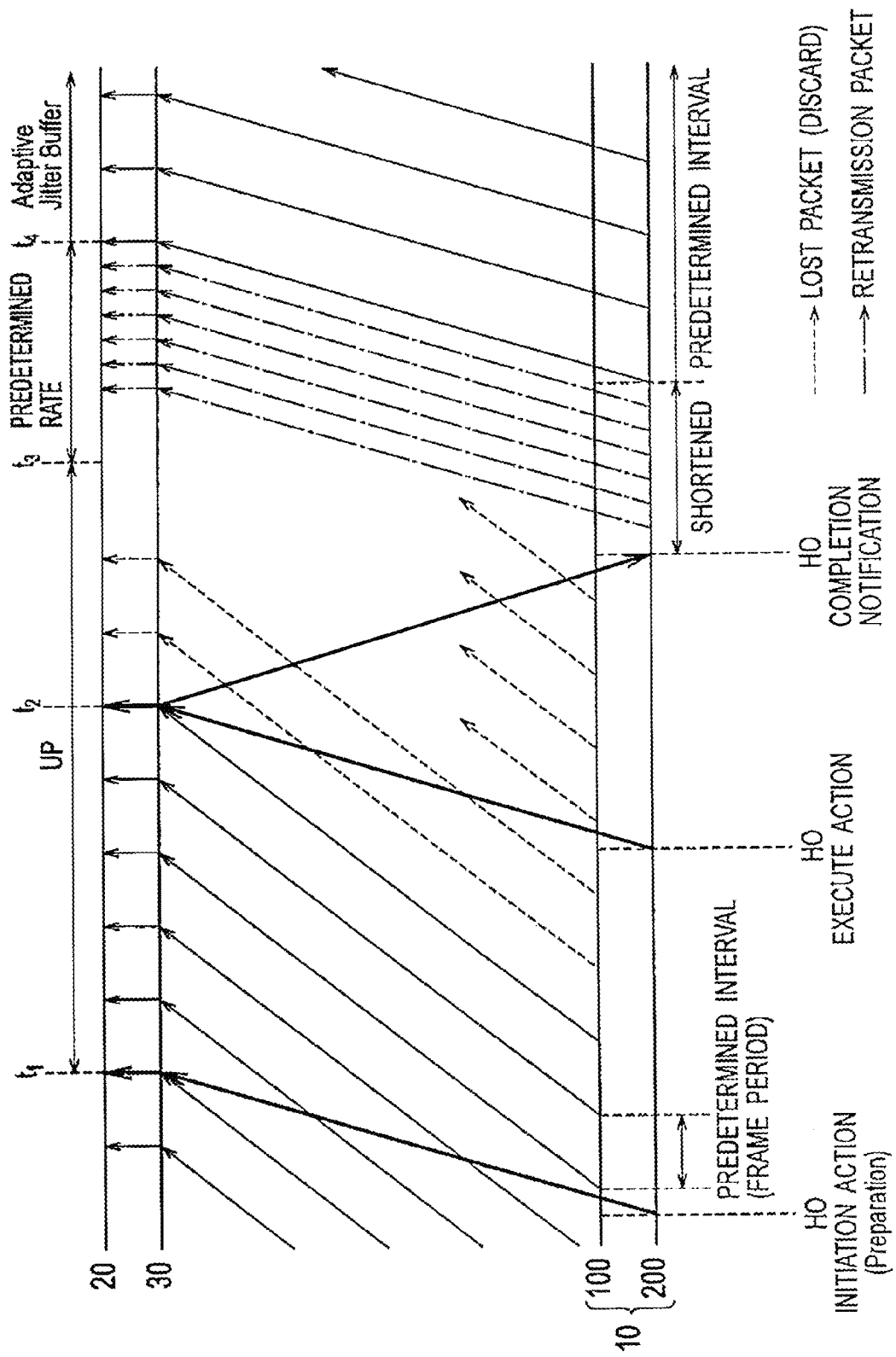

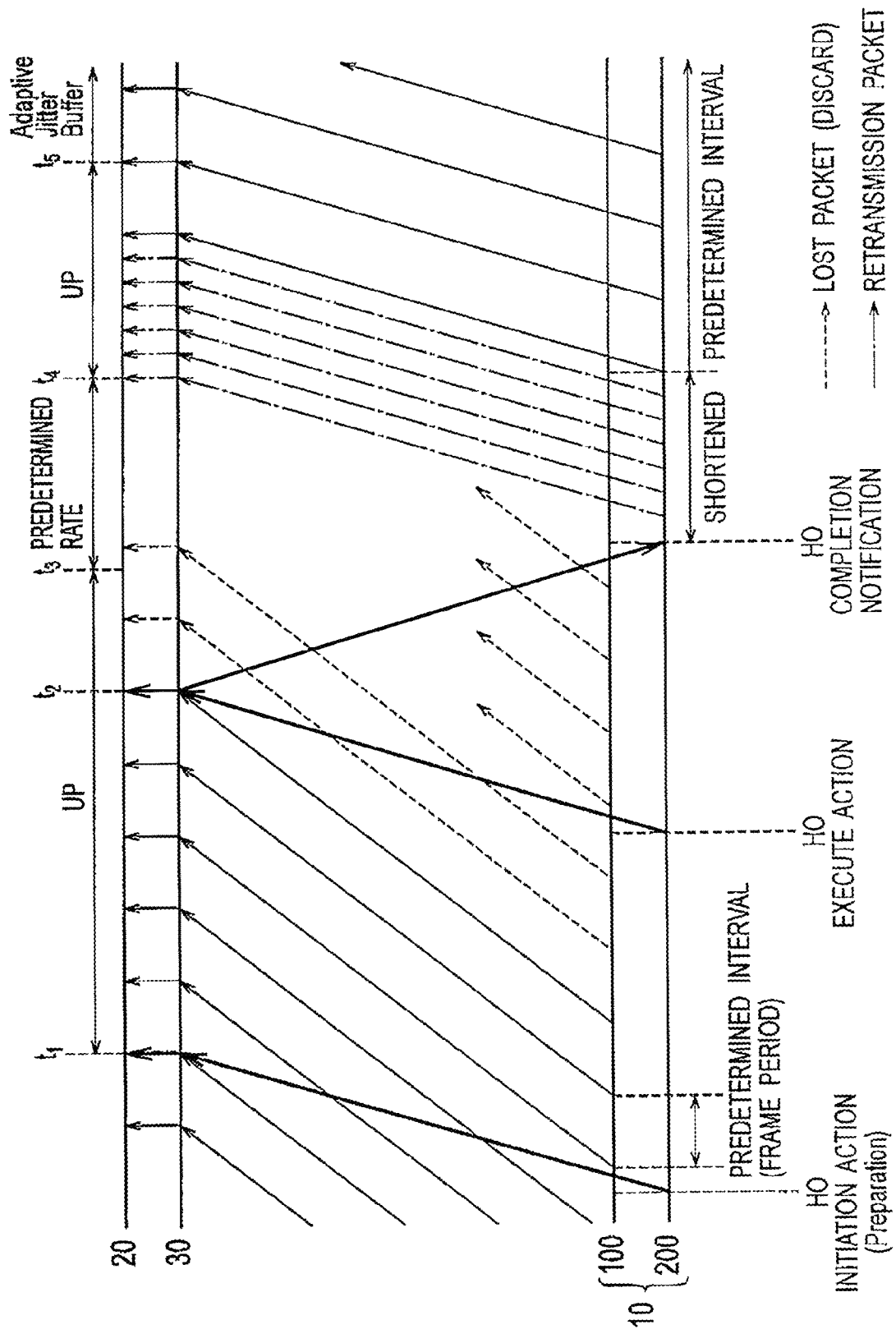

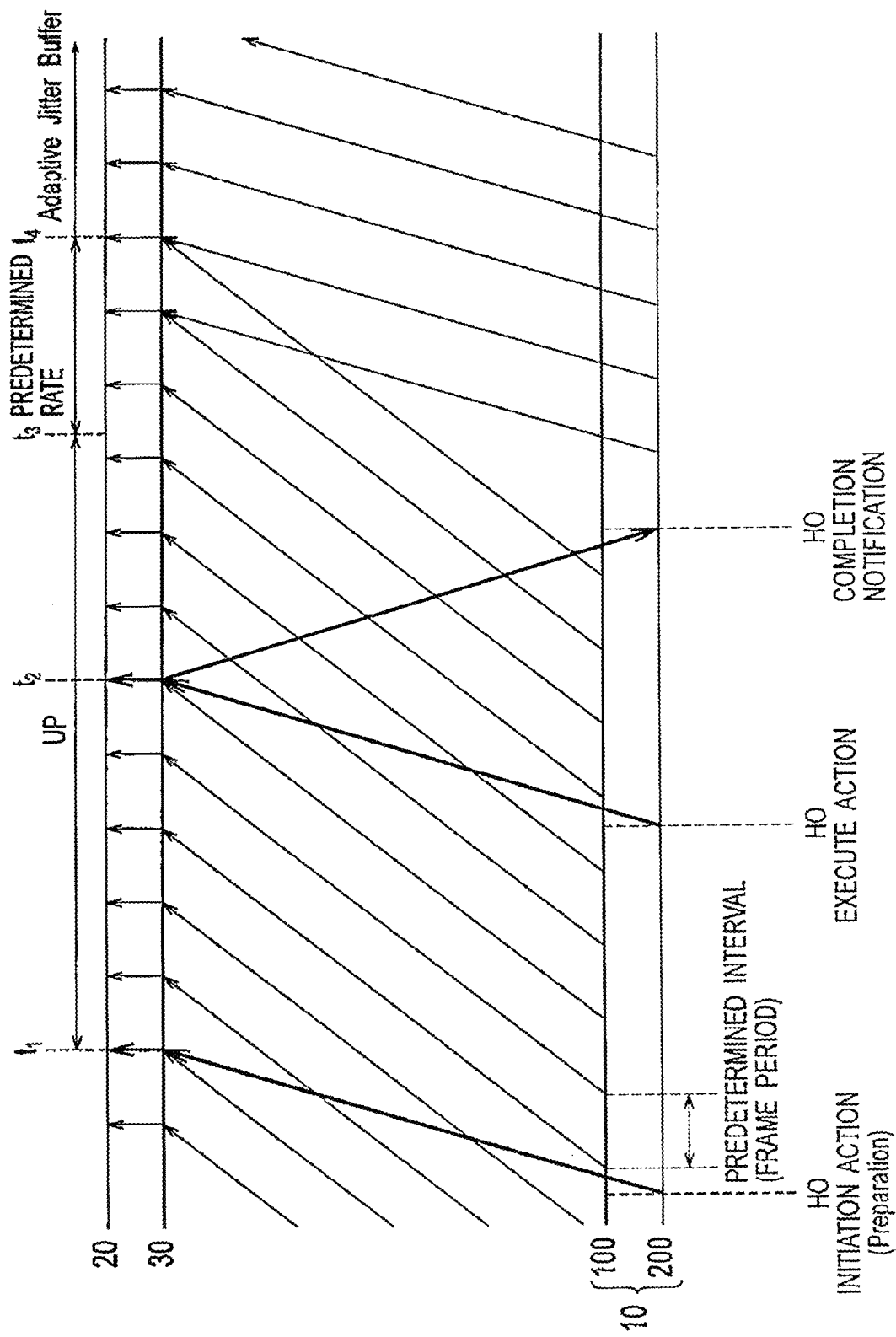

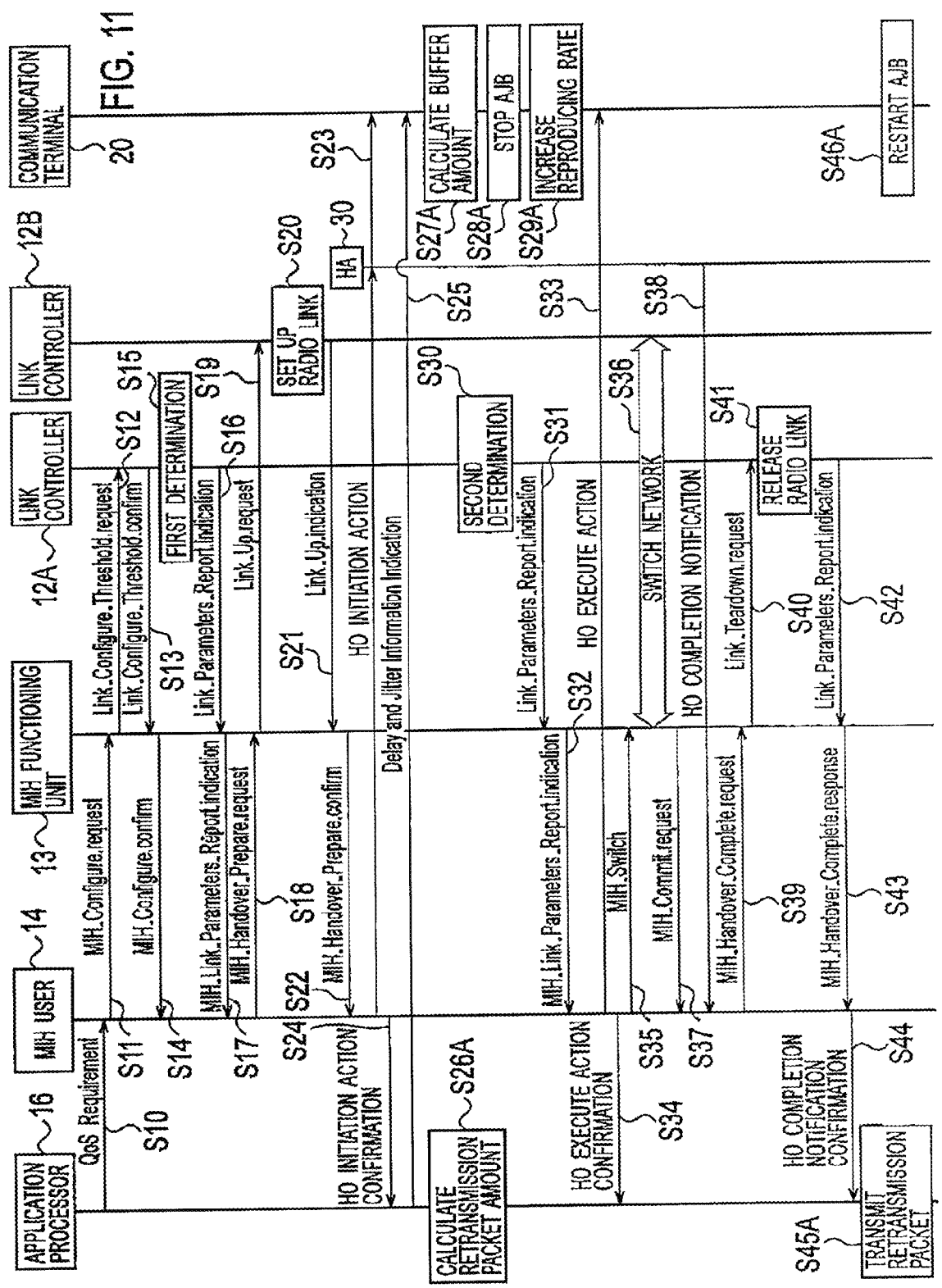

RADIO TERMINAL AND COMMUNICATION TERMINAL

CROSS REFERENCE TO RELATED APPLICATION

This application is based upon and claims the benefit of priority from prior Japanese Patent Application P2008-184340 filed on Jul. 15, 2008; the entire contents of which are incorporated by reference herein.

BACKGROUND OF THE INVENTION

1. Field of the Invention

The present invention relates to a radio terminal and a communication terminal which execute communications through a first network or a second network having a delay time shorter than a delay time in the first network.

2. Description of the Related Art

There has been conventionally known a radio terminal which executes real-time communications (for example, VoIP) with a communication terminal (corresponding node) through a network (see, for example, Japanese Patent Application Publication No. 2008-141266). In the radio terminal, a buffer which temporarily stores packets is provided in order to absorb a delay time and jitter in the network. The amount of packets to be stored in the buffer is determined according to the delay time in the network. Here, the concept of the delay time in the network includes not only a time period (stay time) in which the packet from the communication terminal (corresponding node) stays in the network but also variations of the stay time (jitter).

There has also been proposed an adaptive jitter buffer (AJB) control technique, targeting one network, for adjusting an amount of stored packets (jitter buffer size) by controlling a reproducing rate of the packets according to a delay time (stay time or variations of the stay time) of received packets. In the AJB control technique, when the amount of packets stored in the buffer exceeds an optimum packet amount, the packet reproducing rate is adjusted to a rate higher than a predetermined rate, so that the amount of stored packets is decreased. On the other hand, when the amount of packets stored in the buffer falls below the optimum packet amount, the packet reproducing rate is adjusted to a rate lower than the predetermined rate, so that the amount of stored packets is increased.

Meanwhile, there has been known a technique for executing handover from a first network to a second network. In the handover, a delay time in the second network may differ from a delay time in the first network. In such a case, the handover causes a change in the optimum packet amount as the amount of packets to be stored in the buffer.

For example, suppose the case where the delay time in the first network is longer than the delay time in the second network. In such a case, an appropriate packet amount in the second network is smaller than an appropriate packet amount in the first network. Accordingly, after the handover from the first network to the second network is executed, the amount of packets stored in the buffer becomes unnecessarily large. As a result, the real-time constraint of the packets is lost.

As described above, the AJB control technique is implemented for one network. Accordingly, in the operation using the AJB control technique, the radio terminal sharply decreases the amount of packets stored in the buffer when the handover from the first network to the second network is executed. In other words, the radio terminal sharply increases the packet reproducing rate.

As seen from above, it is difficult to properly control the amount of packets stored in the buffer after the handover from the first network to the second network is executed.

SUMMARY OF THE INVENTION

The present invention has been made to solve the above-described problem. An object of the present invention is to provide a radio terminal and a communication terminal which are capable of properly controlling an amount of packets stored in a buffer after handover from a first network to a second network.

A first characteristic of the present invention is summarized as a radio terminal communicates with a communication terminal through a first network or a second network having a delay time shorter than a delay time in the first network, the radio terminal comprising: a receiver configured to receive packets at predetermined intervals through the first network or the second network; a buffer configured to temporarily store the packets received by the receiver; a transmitter configured to transmit a preparation request for handover from the first network to the second network; and a reproducing unit configured to reproduce the packets stored in the buffer at a predetermined rate determined according to the predetermined intervals. The reproducing unit executes an adaptive buffer control for adjusting a packet reproducing rate so that an amount of the packets stored in the buffer is maintained at an optimum packet amount. The reproducing unit stops the adaptive buffer control in response to a transmission of the preparation request by the transmitter.

According to the first characteristic, in response to the transmission of the handover preparation request, the radio so terminal stops the adaptive buffer control (AJB control). This makes it possible to suppress the rapid change in the packet transmission rate caused by the AJB control when the handover from the first network to the second network is executed.

In the first characteristic, the receiver may receive a completion notification of the handover from the first network to the second network, and the reproducing unit may restart the adaptive buffer control when the amount of the packets stored in the buffer reaches the optimum packet amount in the second network after a reception of the completion notification by the receiver.

In the first characteristic, the reproducing unit may decrease the amount of the packets stored in the buffer by changing the packet reproducing rate to a rate higher than the predetermined rate in response to the transmission of the preparation request by the transmitter.

In the first characteristic, the receiver may receive a completion notification of the handover from the first network to the second network, and the reproducing unit may reset the packet reproducing rate to the predetermined rate when the amount of the packets stored in the buffer reaches a predetermined amount before a reception of the completion notification by the receiver.

In the first characteristic, the receiver may receive a completion notification of the handover from the first network to the second network, the reproducing unit may reset the packet reproducing rate to the predetermined rate when the amount of the packets stored in the buffer reaches a predetermined amount before a reception of the completion notification by the receiver, and the reproducing unit may change again the packet reproducing rate to a rate higher than the predetermined rate in response to the reception of the completion notification by the receiver.

In the first characteristic, the predetermined amount may be calculated based on the delay time in the first network and the delay time in the second network.

A second characteristic of the present invention is summarized as a communication terminal communicates with a radio terminal through a first network or a second network having a delay time shorter than a delay time in the first network, the communication terminal comprising: a receiver configured to receive packets from the radio terminal at predetermined intervals; a buffer configured to temporarily store the packets received by the receiver; and a reproducing unit configured to reproduce the packets stored in the buffer at a predetermined rate determined according to the predetermined intervals. The receiver receives a preparation request from the radio terminal for handover from the first network to the second network. The reproducing unit executes an adaptive buffer control for adjusting a packet reproducing rate so that an amount of the packets stored in the buffer is maintained at an optimum packet amount. The reproducing unit stops the adaptive buffer control in response to a reception of the preparation request by the receiver.

According to the second characteristic, in response to the reception of the handover preparation request, the communication terminal stops the adaptive buffer control (AJB control). This makes it possible to suppress the rapid change in the packet transmission rate caused by the AJB control when the handover from the first network to the second network is executed.

In the first characteristic, the receiver may receive an execution request for the handover from the radio terminal, and the reproducing unit may restart the adaptive buffer control when the amount of the packets stored in the buffer reaches the optimum packet amount in the second network after a reception of the execution request by the receiver.

In the first characteristic, the reproducing unit may decrease the amount of the packets stored in the buffer by changing the packet reproducing rate to a rate higher than the predetermined rate in response to the reception of the preparation request by the receiver.

In the first characteristic, the reproducing unit may reset the packet reproducing rate to the predetermined rate when the amount of the packets stored in the buffer reaches a predetermined amount before a reception of a first packet among packets received through the second network by the receiver.

In the first characteristic, the reproducing unit may reset the packet reproducing rate to the predetermined rate when the amount of the packets stored in the buffer reaches a predetermined amount before a reception of a first packet among packets received through the second network by the receiver, and the reproducing unit may change again the packet reproducing rate to a rate higher than the predetermined rate in response to the reception of the first packet by the receiver.

In the first characteristic, the predetermined amount may be calculated based on the delay time in the first network and the delay time in the second network.

The present invention can provide a radio terminal and a communication terminal which are capable of properly controlling the amount of packets stored in the buffer after the handover from the first network to the second network.

BRIEF DESCRIPTION OF THE DRAWINGS

FIG. 7 is a sequential diagram showing an operation of the communication system according to the first embodiment.

FIG. 8 is a diagram showing an example of reproducing rate control according to a second embodiment;

FIG. 9 is a diagram showing an example of reproducing rate control according to the second embodiment;

FIG. 10 is a diagram showing an example of reproducing rate control according to the second embodiment; and FIG. 11 is a sequential diagram showing the operation of a communication system according to the second embodiment.

DESCRIPTION OF THE PREFERRED EMBODIMENTS

Figure 1:
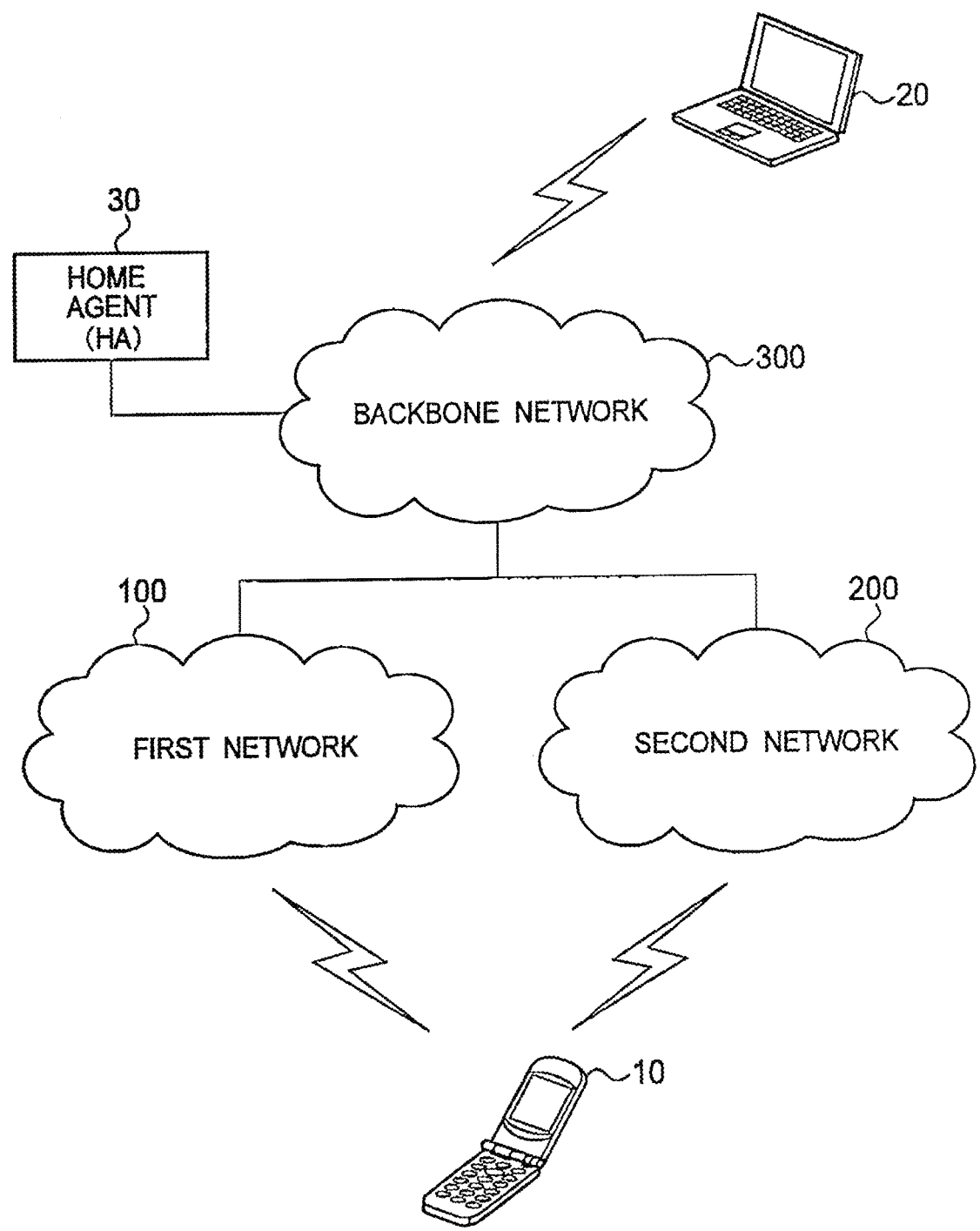
FIG. 1 is a view showing the configuration of a communication so system according to a first embodiment.

Preferred embodiments of the present invention are described below. In the following description of the drawings, same or similar reference numerals are given to denote same or similar portions. However, it should be noted that the drawings are schematic and ratios of dimensions and the like are different from actual ones.

Therefore, specific dimensions and the like should be determined by taking into consideration the following description. Moreover, as a matter of course, among the drawings, there are also included portions in which dimensional relationships and ratios are different from each other.

First Embodiment

Configuration of Communication System

The configuration of a communication system according to a first embodiment of the present invention is described below by referring to the drawings. FIG. 1 is a view showing the configuration of a communication system according to the first embodiment.

As shown in FIG. 1, the communication system includes a radio terminal 10, a communication terminal 20, a home agent 30, a first network 100, a second network 200, and a backbone network 300.

In the first embodiment, a delay time in the first network 100 is longer than a delay time in the second network 200. The radio terminal 10 executes communications with the communication terminal 20 through the first network 100 or the second network 200.

It should be noted here that the concept of the delay time in a network includes not only a time period in which a packet from the communication terminal 20 (corresponding node) stays in the network (stay time) but also variations of the stay time (jitter). The stay time has correlation with the jitter. In general, the longer the stay time is, the larger the jitter becomes.

In the first embodiment, the description is mainly given of a case where handover from the first network 100 to the second network 200 is executed on the radio terminal 10. In addition, the flow of a packet from the communication terminal 20 to the radio terminal 10 is mainly described.

The radio terminal 10 is a terminal such as a mobile telephone, a PDA, or a notebook personal computer. Also, the radio terminal 10 may be a terminal such as a mobile router.

As described above, the radio terminal 10 is a terminal (MN: Mobile Node) which executes communications with the communication terminal 20 through the first network 100 or the second network 200. That is, the radio terminal 10 executes communications with the communication terminal 20 by utilizing the first network 100 or the second network 200. The radio terminal 10 receives packets transmitted from the communication terminal 20 at predetermined intervals (frame periods). Here, the radio terminal 10 is a subject that executes handover from the first network 100 to the second network 200. The details of the radio terminal 10 are described later (see FIG. 2).

The communication terminal 20 is a terminal such as a mobile telephone, a PDA, a notebook personal computer, or desktop personal computer. The communication terminal 20 is a communication terminal (CN: Corresponding Node) which executes communications with the radio terminal 10. Also, the communication terminal 20 transmits packets to the radio terminal 10 at predetermined intervals (frame periods).

The communication terminal 20 may be a terminal which is connected by radio to the backbone network 300 or may be a terminal which is connected by wire to the backbone network 300. In the first embodiment, the case where the communication terminal 20 is a radio terminal is shown as an example. Although it is not shown in FIG. 1, the communication terminal 20 is connected to the backbone network 300 through multiple radio networks. The details of the communication terminal 20 are described later (see FIG. 3).

The home agent 30 (HA) is connected to the backbone network 300. The home agent 30 manages a Care of Address (CoA) of the radio terminal 10.

The first network 100 and the second network 200 are radio networks having different radio communication schemes (configurations of physical layers or link layers). For example, the first network 100 is a radio network that uses "1×EV-DO" complying with the CDMA2000. The second network 200 is a radio network that uses "WiMAX" complying with IEEE802.16e.

However, the first network 100 and the second network 200 are not limited to those configurations. For example, the first and second networks 100 and 200 may be networks that use "WLAN" complying with IEEE802.11.

The backbone network 300 is an upper network of the first network 100 and the second network 200. For example, the backbone network 300 is the Internet network complying with IP (Internet Protocol). In the first embodiment, the communication terminal 20 and the home agent 30 are connected to the backbone network 300.

(Configuration of Radio Terminal)

Figure 2:
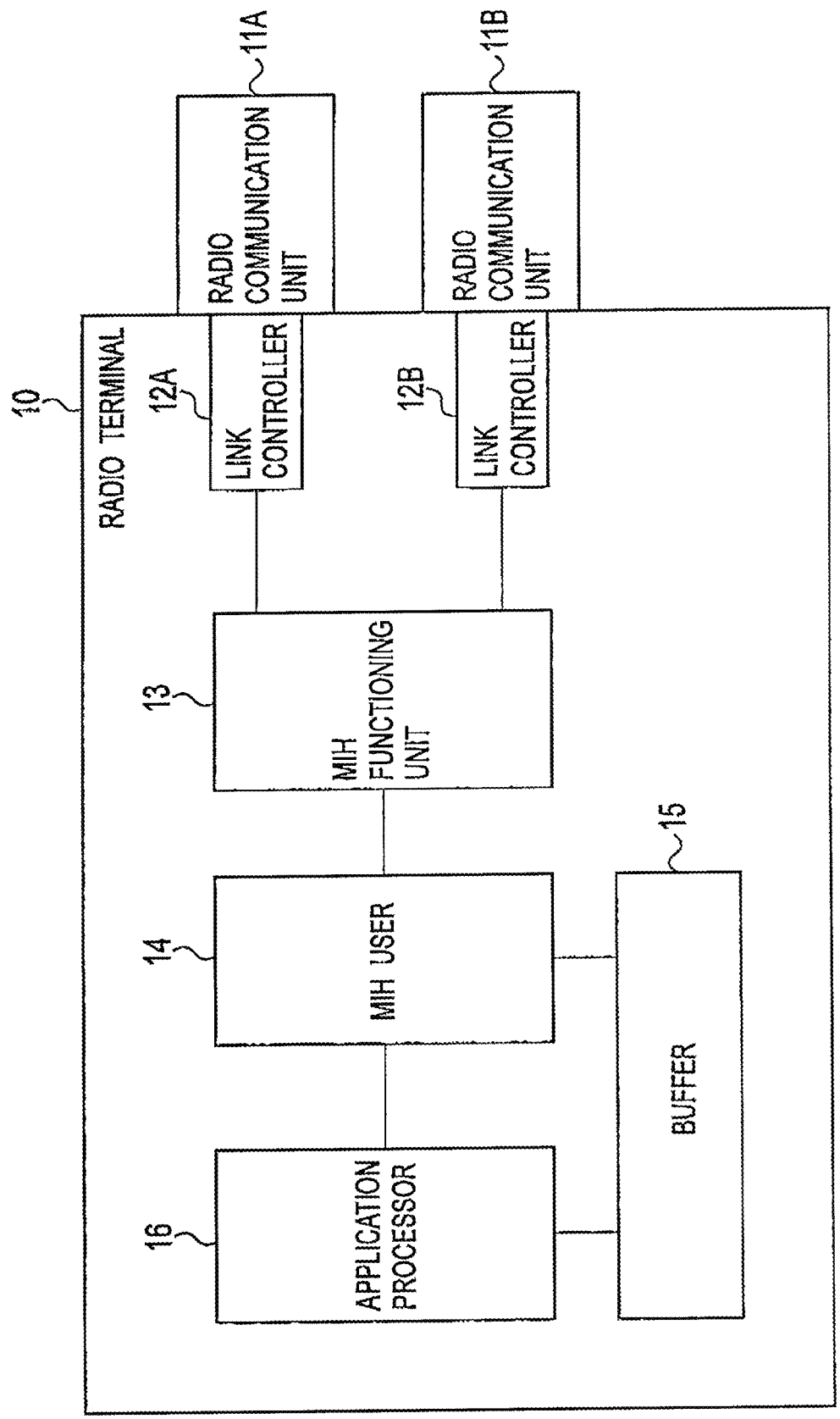
FIG. 2 is a block diagram showing a radio terminal according to the first embodiment.

In the following description, the configuration of a radio terminal (MN) according to the first embodiment is described below by referring to the drawings. FIG. 2 is a block diagram showing the radio station 10 according to the first embodiment.

As shown in FIG. 2, the radio terminal 10 has multiple radio communication units 11 (radio communication units 11A and 11B), multiple link controllers 12 (link controllers 12A and 12B), an MIH functioning unit 13, an MIH user 14, a buffer 15, and an application processor 16.

The radio communication unit 11 sets up a physical radio connection in a physical layer with each network in response to an instruction from upper layers (for example, the MIH functioning unit 13 or the application processor 16). The radio communication unit receives packets from the communication terminal 20 at predetermined intervals.

Specifically, the radio communication unit 11A sets up a physical radio connection corresponding to "1×EV-DO" with the first network 100. In addition, the radio communication unit 11B sets up a physical radio connection corresponding to "WiMAX" with the second network 200.

The link controller 12 sets up a radio link in a link layer with each network in response to an instruction from the upper layers (for example, the MIH functioning unit 13 or the application processor 16). The link controller 12 monitors various radio parameters (link parameters) in the radio link set up with each network.

Specifically, the link controller 12A has a function of an interface (disk driver) with the radio communication unit 11A. The link controller 12A sets up a radio link corresponding to "1×EV-DO" with the first network 100. The link controller 12B has a function of an interface (device driver) with the radio communication unit 11B. The link controller 12B sets up a radio link corresponding to "WiMAX" with the second network 200.

The MIH functioning unit 13 controls handover between the networks in response to an instruction from the MIH user 14 or the application processor 16 which functions as an upper layer of the MIH functioning unit 13. The MIH functioning unit 13 is a Media Independent Handover Function which is independent from the configuration of the physical layer and defined in IEEE802.21.

The MIH functioning unit 13 manages various conditions for handover in a network to which the own radio terminal 10 connects. Specifically, the MIH functioning unit 13 manages, for each network, the types of the radio parameters, a first threshold (initiate action threshold), a second threshold (execute action threshold), a first logical expression for a first determination (herein after, referred to as "a first logical expression"), and a second logical expression for a second determination (herein after, referred to as "a second logical expression").

The types of the radio parameters indicate radio parameters to be monitored in the radio link set up between the radio terminal 10 and the network to which the radio terminal 10 connects.

For example, when the network to which the radio terminal 10 connects is the first network 100, the radio parameters shown below are monitored by the link controller 12A in the radio link set up with the first network 100.
(a) Signal to Interference and Noise Ratio (SINR)
(b) Received Signal Strength Indicator (RSSI)
(c) Data Rate Control (DRC)
(d) Transmission Power (Tx_Power)
(e) Percentage that a radio base station normally receives DRC transmitted from a radio terminal (DRC_Lock)

When the network to which the radio terminal 10 connects is the second network 200, the radio parameters shown below are monitored by the link controller 12B in the radio link set up with the second network 200.
(a) Signal to Interference and Noise Ratio (SINR)
(b) Received Signal Strength Indicator (RSSI)
(c) Successful Ratio of DL-MAP Receive
(d) Transmission rate (Rate)
(e) Uplink Modulation Class
(f) Transmission Power (Tx_Power)

The first threshold (initiate action threshold) is a threshold set for each radio parameter to determine whether or not to execute a handover preparation request (Initiation Action). Here, the handover preparation request (Initiation Action) is an operation, in a case where a radio link has been set up with one network, to set up a radio link with another network.

For example, when the radio terminal 10 connects to the first network 100, the first threshold set for a signal to interference and noise ratio (SINR) is "0 dB." Similarly, "−80 dBm", "6", "15 dBm", "0.8" are respectively set for other radio parameters in the above order.

When the radio terminal 10 connects to the second network 200, the first threshold set for a signal to interference and noise ratio (SINR) is "3 dB." Similarly, "−75 dBm", "0.1", "500 kbps", "QPSK3/4" and "20 dBm" are respectively set for other radio parameters in the above order.

The second threshold (execute action threshold) is a threshold set for each radio parameter to determine whether or not to execute a handover execution request (execute action). Here, the handover execution request (execute action) is a request operation (such as BU: Binding Update or RR: Registration Request) for switching the network to which the radio terminal 10 connects, in a case where the radio links are set up with one network and another network. As the second threshold (execute action threshold), a value for the case where the radio environment is deteriorated in comparison with the radio environment of the first threshold (initiate action threshold) is set.

For example, when the radio terminal 10 connects to the first network 100, the second threshold set for the signal to interference and noise ratio (SINR) is "−5 dB." Similarly, "−90 dBm", "4", "23 dBm", "0.8" are respectively set for other radio parameters in the above order.

When the radio terminal 10 connects to the second network 200, the second threshold set for the signal to interference and noise ratio (SINR) is "−2 dB." Similarly, "−80 dBm", "0.8", "200 kbps", "QPSK 1/2", and "23 dBm" are respectively set for other radio parameters in the above order.

The first logical expression is a condition (first condition) for executing a handover preparation request (Initiation Action). Specifically, the first logical expression indicates a combination of the first thresholds that should be satisfied by the multiple radio parameters in the radio link to be set up with the network to which the radio terminal 10 connects.

For example, when the radio terminal 10 connects to the first network 100, and when any one of conditions described below is satisfied, the handover preparation request is executed.
(a) All of SINR, RSSI, and DRC are deteriorated in comparison with the first threshold.
(b) Both of Tx_Power and DRC_Lock are deteriorated in comparison with the first threshold.

When the radio terminal 10 connects to the second network 200, and when any one of conditions described below is satisfied, the handover preparation request (Initiation action) is executed.
(a) SINR, RSSI, and Successful ratio of DL_MAP Receive are all deteriorated in comparison with the first threshold.
(b) Tx_Power and upper modulation class are both deteriorated (decreased) in comparison with the first threshold.

The second logical expression is a Condition (second condition) for executing a handover execution request (execute action). Specifically, the second logical expression indicates a combination of the second thresholds that should be satisfied by the multiple radio parameters in the radio link to be set up with the network to which the radio terminal 10 connects.

In the first embodiment, the combination of the second thresholds to be satisfied by the multiple parameters in the second logical expression is the same as the combination of the first thresholds to be satisfied by the multiple parameters in the first logical expression. However, the combination of the second thresholds to be satisfied by the multiple parameters in the second logical expression may be different from the combination of the first thresholds to be satisfied by the multiple parameters in the first logical expression.

The MIH user 14 is a mobility management unit configured to manage mobility between the networks in response to an instruction from the application processor 16 functioning as an upper layer of the MIH user 14. The MIH user 14 also functions as an upper layer of the MIH functioning unit 13.

The buffer 15 temporarily stores packets received through the first network 100 or the second network 200.

An appropriate packet amount is determined for the buffer 15 according to the delay time in the network. The appropriate packet amount is determined based on viewpoints of suppressing the lack of packet and maintaining the real-time constraint of the packets. The longer the delay time in the network is, the larger the optimum packet amount is.

For example, in the case where the radio terminal 10 receives packets through the first network 100, the optimum packet amount (hereinafter, a first optimum packet amount) of the buffer 13 is determined according to the delay time in the first network 100. Similarly, in the case where the radio terminal 10 receives packets through the second network 200, the optimum packet amount (hereinafter, a second optimum packet amount) of the buffer 15 is determined according to the delay time in the second network 200.

As described above, the delay time in the first network 100 is longer than the delay time in the second network 200. Accordingly, the first optimum packet amount is larger than the second optimum packet amount.

The application processor 16 functions as an upper layer of the MIH user 14. The application processor 16 processes various applications and the like. For example, the application processor 16 reproduces the packets (plays the contents in the packets) stored in the buffer 15 at a predetermined rate. The predetermined rate is determined according to the predetermined intervals at which the packets are received.

Here, the application processor 16 executes adaptive buffer control (hereinafter, AJB (Adaptive Jitter Buffer) control) for adjusting a packet reproducing rate so that the amount of packets stored in the buffer 15 is maintained at the optimum packet amount.

For example, in the case where the radio terminal 10 receives the packets through the first network 100, the application processor 16 adjusts the packet reproducing rate so that the amount of packets stored in the buffer 15 is maintained at the first optimum packet amount. Similarly, in the case where the radio terminal 10 receives the packets through the second network 200, the application processor 16 adjusts the packet reproducing rate so that the amount of packets stored in the buffer 15 is maintained at the second optimum packet amount.

The application processor 16 stops the AJB control in response to the start of the preparation request for handover from the first network 100 to the second network 200 (i.e. in response to the transmission of the preparation request). The application processor 16 restarts the AJB control when the amount of packets stored in the buffer 15 reaches the second optimum packet amount after the handover from the first network 100 to the second network 200 is completed.

Figure 4:
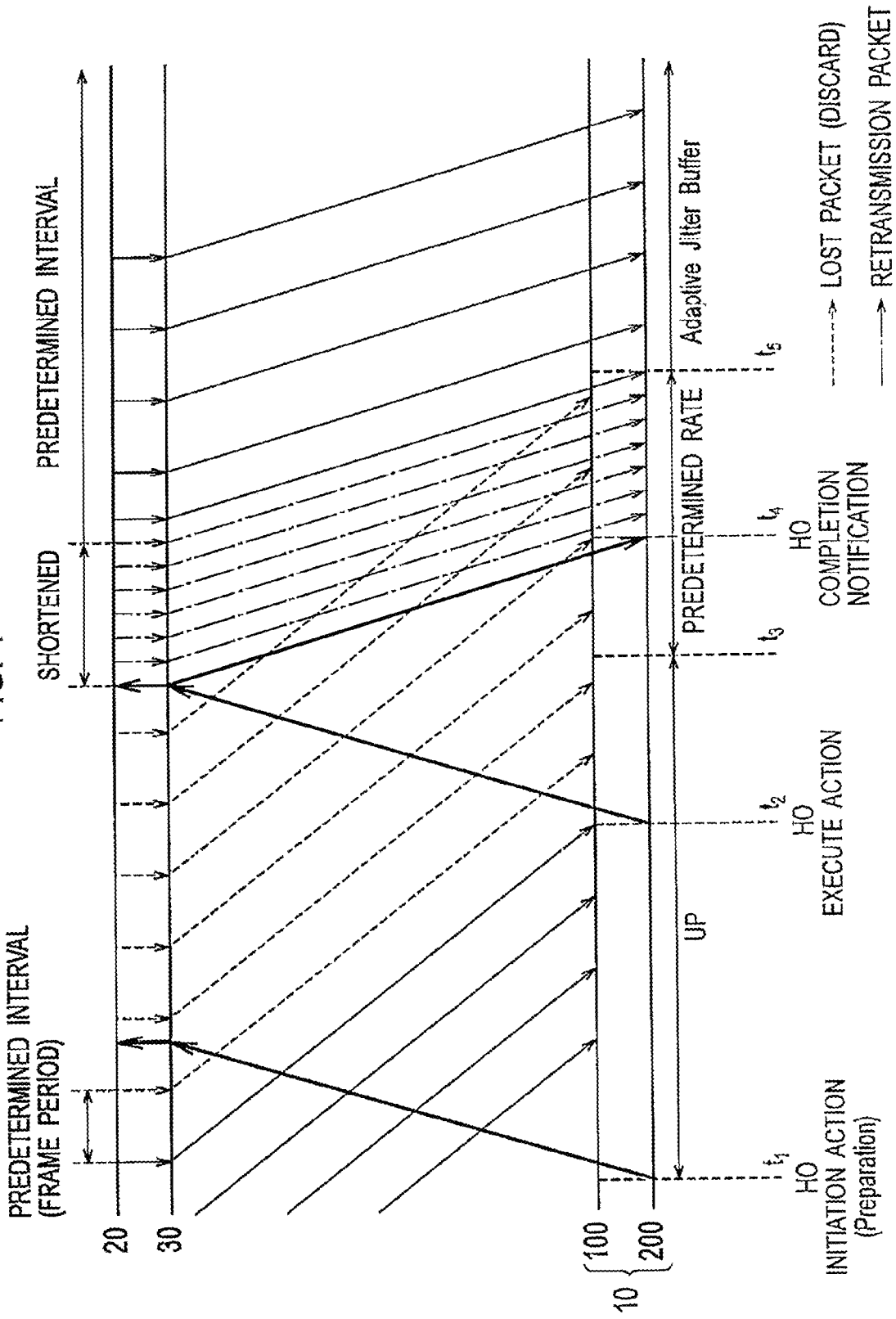
FIG. 4 is a diagram showing an example 1 of reproducing rate control according to the first embodiment.
Figure 5:
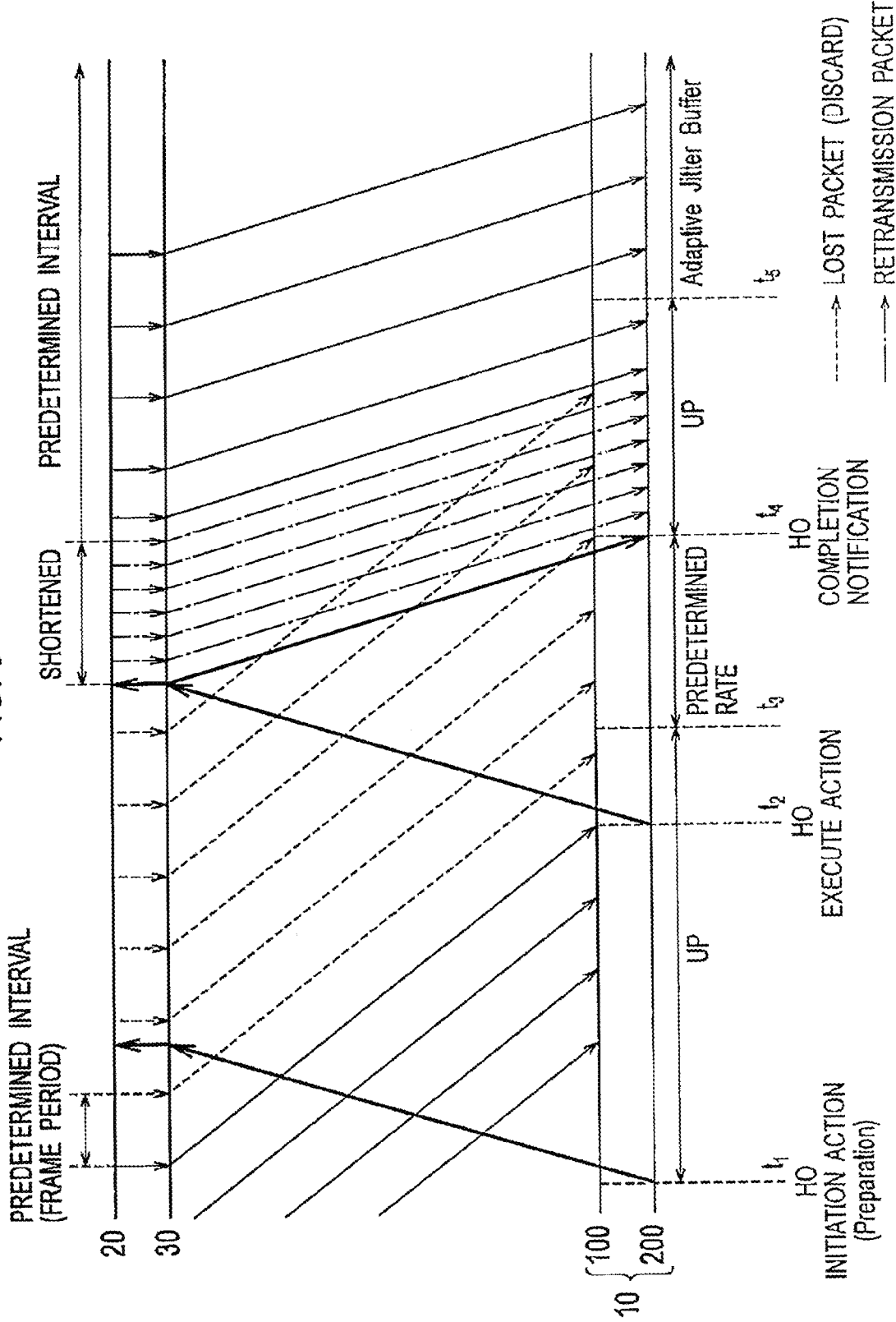
FIG. 5 is a diagram showing an example 2 of reproducing rate control according to the first embodiment.
Figure 6:
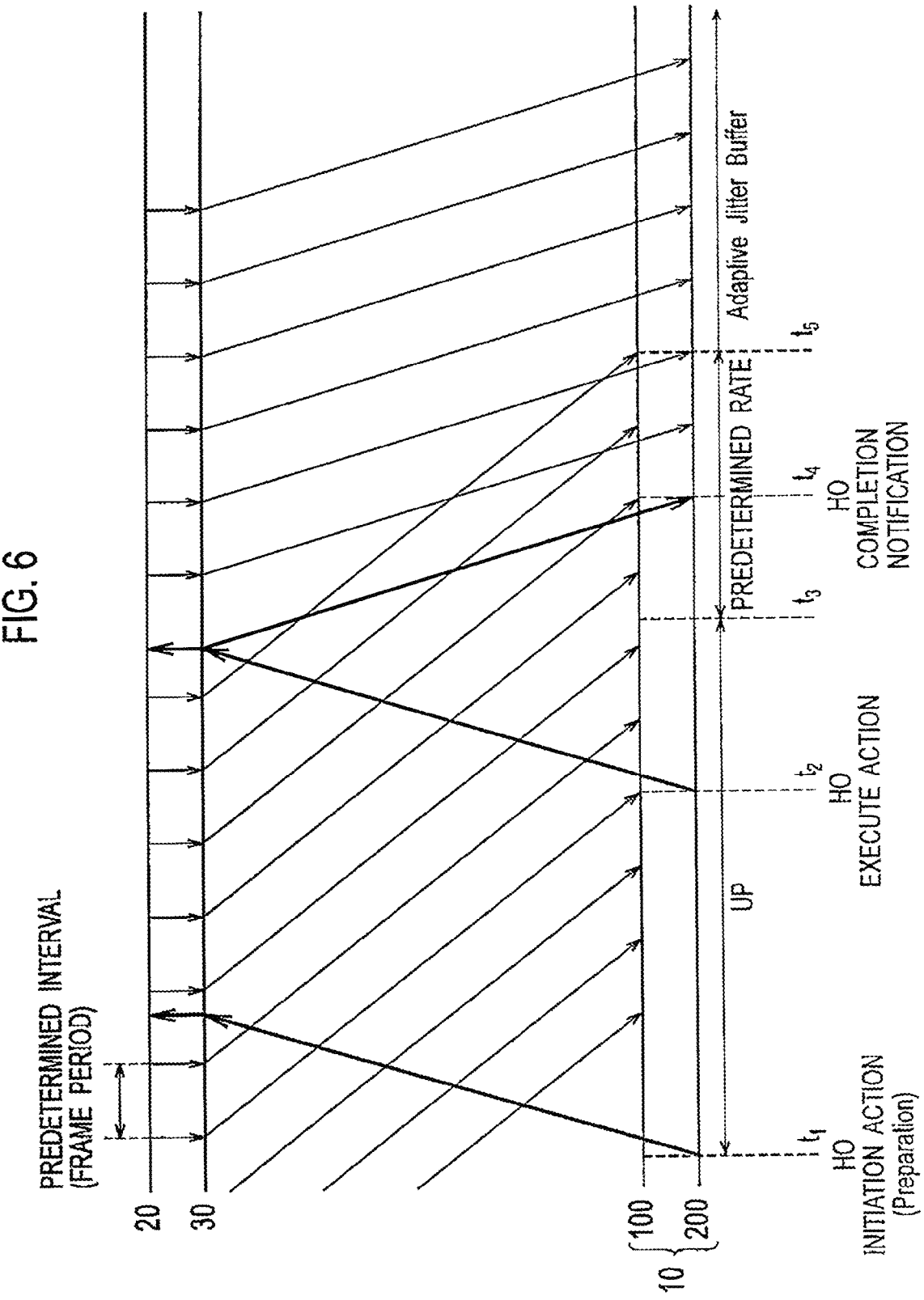
FIG. 6 is a diagram showing an example 3 of reproducing rate control according to the first embodiment.

It should be noted here that the application processor 16 controls the packet reproducing rate, separately from the AJB control, even during a period from the stop of the AJB control to the restart of the AJB control. Specifically, the application processor 16 changes the packet reproducing rate to a rate higher than a predetermined rate when the preparation request for the handover from the first network 100 to the second network 200 is started. Here, it is preferable that an upper limit is provided for an increase range of the packet reproducing rate. For example, it is preferable that the increase range of the packet reproducing rate be 10 to 15% of the predetermined rate. The control of the packet reproducing rate is described later in detail (FIGS. 4 to 6).

(Configuration of Communication Terminal)

Figure 3:
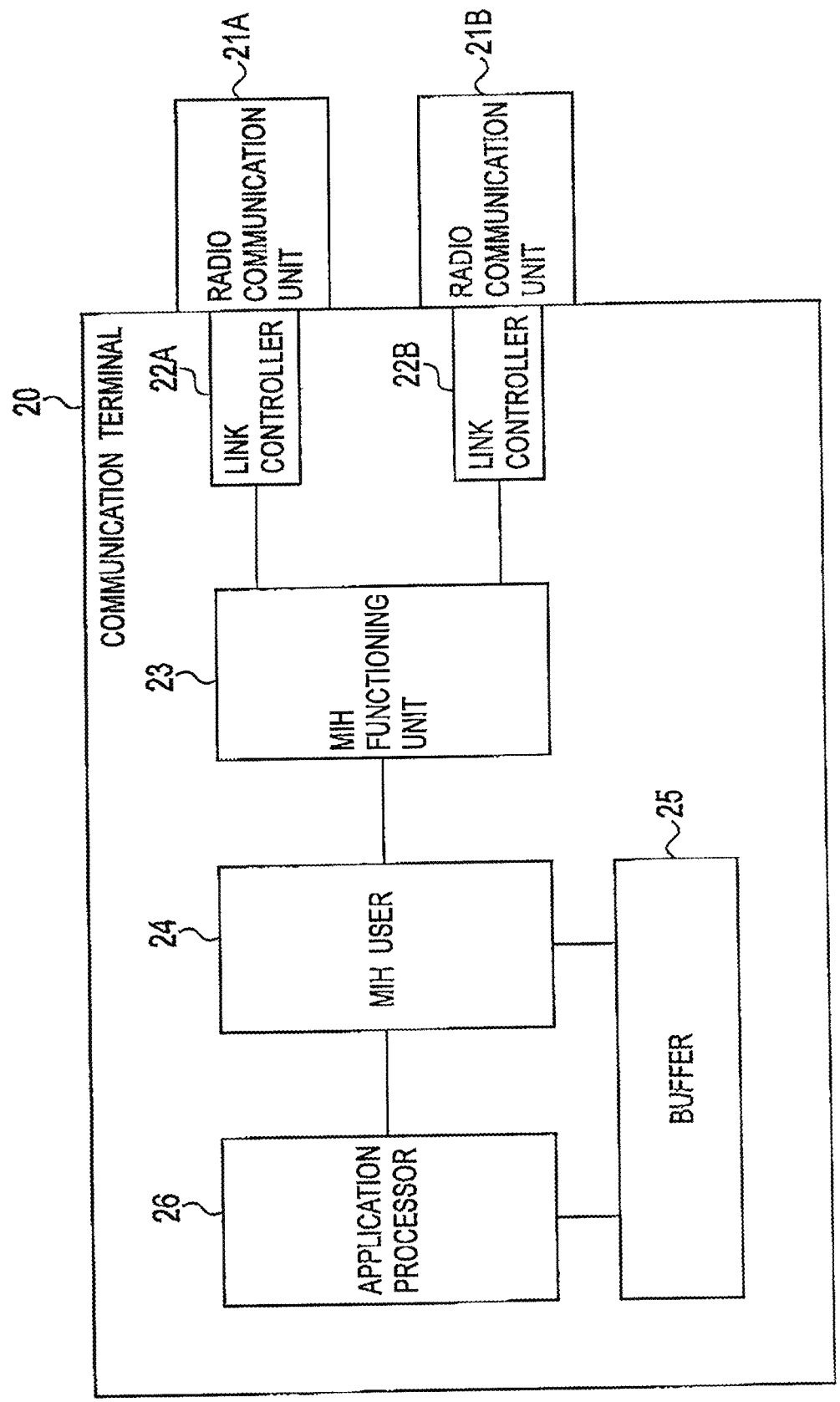
FIG. 3 is a block diagram showing a communication terminal according to the first embodiment.

In the following description, the configuration of the communication terminal (CN: Corresponding Node) according to the first embodiment is described by referring to the drawings. FIG. 3 is a block diagram showing the communication terminal 20 according to the first embodiment. It should be noted that the communication terminal 20 has the configuration similar to that of the radio terminal 10 and, thus, the communication terminal 20 is described only briefly.

As shown in FIG. 3, the communication terminal 20 has multiple radio communication units 21 (radio communication units 21A and 21B), multiple link controllers 22 (link controllers 22A and 22B), an MIH functioning unit 23, an MIH user 24, a buffer 25, and an application processor 26.

The radio communication unit 21 sets up a physical radio connection in a physical layer with each network in response to an instruction from the upper layer (for example, the MIH functioning unit 23 or the application processor 26). The radio communication unit 21 transmits packets to the radio terminal 10 at predetermined intervals. In addition, the radio communication unit 21 transmits retransmission packets to the radio terminal 10 at intervals shorter than the predetermined interval. It should be noted that the radio communication unit 21 transmits the retransmission packets at a coding rate lower than a coding rate of the packets transmitted at the predetermined intervals.

The retransmission packets are packets (lost packets) which cannot be normally received by the radio terminal 10 in the handover from the first network 100 to the second network 200. For example, in the case where the handover from the first network 100 to the second network 200 is executed by the radio terminal 10, the retransmission packets include lost packets discarded in the radio terminal 10 (discarded packets), lost packets which cannot be received through the first network 100, and the like.

The link controller 22 sets up a radio link in a link layer with a network in response to an instruction from the upper layer (for example, the MIH functioning unit 23 or the application processor 26).

The MIH functioning unit 23 controls handover between the networks in response to an instruction from the MIH user 24 or the application processor 26 which functions as an upper layer of the MIH functioning unit 23. The MIH functioning unit 23 is a Media Independent Handover Function which is independent from the configuration of the physical layer and defined in IEEE802.21.

The MIH user 24 is a mobility managing unit configured to manage mobility between the networks in response to an instruction from the application processor 26 functioning as a upper layer of the MIH user 24. The MIH user 24 also functions as an upper layer of the MIH functioning unit 23.

The buffer 25 temporarily stores packets received from the backbone network 300 through the first network 100 or the second network 200. Here, an appropriate packet amount is determined for the buffer 25 according to the delay time in the network. The appropriate packet amount is determined based on viewpoints of suppressing the lack of packet and maintaining the real-time constraint of the packets. The longer the delay time in the network is, the larger the optimum packet amount is.

For example, in the case where packets are received from the radio terminal 10 through the first network 100, the optimum packet amount in the buffer 25 is determined according to the delay time in the first network 100. Similarly, in the case where packets are received from the radio terminal 10 through the second network 200, the optimum packet amount in the buffer 25 is determined according to the delay time in the second network 200.

The application processor 26 functions as an upper layer of the MIH user 24. The application processor 26 processes various applications and the like. For example, the application processor controls a transmission interval and coding rate of the retransmission packets.

Specifically, the application processor 26 calculates the amount of retransmission packets (that is, the amount of the lost packets) on the basis of the delay time in the first network 100 and the delay time in the second network 200. The application processor 26 instructs the radio communication unit 21 to transmit the retransmission packets at intervals shorter than the predetermined interval. In addition, the application processor 26 instructs the radio communication unit 21 to transmit the retransmission packets at a coding rate lower than the coding rate of the packet transmitted at the predetermined intervals.

(Example of Packet Reproducing Rate Control)

In the following description, examples of controlling a packet reproducing rate are described by referring to FIGS. 4 to 6. In the following description, the delay time of packets transmitted from the communication terminal 20 to the radio terminal 10 through the first network 100 is denoted by "Dold_dn." and the delay time of packets transmitted from the radio terminal 10 to the communication terminal 20 through the first network 100 is denoted by "Dold_up." Similarly, the delay time of packets transmitted from the communication terminal 20 to the radio terminal 10 through the second network 200 is denoted by "Dnew_dn" and the delay time of packets transmitted from the radio terminal 10 to the communication terminal 20 through the second network 200 is denoted by "Dnew_up."

(Example 1 of Packet Reproducing Rate Control)

Example 1 of controlling a packet reproducing rate according to the first embodiment is described below by referring to the drawings. FIG. 4 is a view showing Example 1 of controlling a packet reproducing rate according to the first embodiment. Here, a case where the radio terminal 10 is based on a SCoA (Single Care of Address) is shown as an example. In the SCoA, the radio terminal 10 receives packets through any one of networks of the first network 100 and the second network 200.

The radio terminal 10 transmits a handover preparation request to the home agent 30 at time $t_1$. That is, at time $t_1$, the first logical expression is satisfied. At time $t_1$, the radio terminal 10 changes the packet reproducing rate to a higher (faster) rate than the predetermined rate. In addition, at time $t_1$, the radio terminal 10 stops the AJB control.

The radio terminal 10 transmits a handover execution request to the home agent 30 at time $t_2$. That is, at time $t_2$, the second logical expression is satisfied. It should be noted that during a time period between time $t_1$ and time $t_2$, the amount of the packets stored in the buffer 15 is decreased since the packet reproducing rate is higher (faster) than the predetermined rate.

At time $t_3$, the radio terminal 10 detects that the amount of the packets stored in the buffer 15 reaches a predetermined amount. At time $t_3$, the radio terminal 10 resets the packet reproducing rate to the predetermined rate. It should be noted that during a time period between time $t_2$ and time $t_3$, the amount of the packets stored in the buffer 15 is further decreased, since the packet reproducing rate is higher (faster) than the predetermined rate and the packets are discarded in the radio terminal 10.

The predetermined amount is calculated based on the delay time in the first network 100 and the delay time in the second network 200. For example, the predetermined amount is calculated based on the amount of the retransmission packets corresponding to the lost packets (discarded packets). The amount (the number) of the retransmission packets from the communication terminal 20 to the radio terminal 10 is calculated by "(Dold_dn+Dnew_up)/predetermined interval (frame period)." Specifically, the predetermined amount is calculated so that the amount of the packets stored in the buffer 15 would become the second optimum packet amount at the timing (time $t_5$) of receiving the last retransmission packet among the retransmission packets transmitted from the communication terminal 20.

In a period during which the radio terminal 10 cannot receive the packets from the communication terminal 20 (hereinafter, gap period), it is preferable that the packets stored in the buffer 15 should not be exhausted. The gap period is calculated by "Dnew_dn+Dnew_up." The predetermined amount and the increase range of the packet reproducing rate are determined so that the packets stored in the buffer 15 would not be exhausted during the gap period.

At time $t_4$, the radio terminal 10 receives a completion notification of the handover from the home agent 30. During a time period between time $t_4$ and time $t_5$, the radio terminal 10 receives the retransmission packets at intervals shorter than the predetermined interval through the second network 200.

In other words, the communication terminal 20 transmits the retransmission packets at intervals shorter than the predetermined interval through the second network 200, in response to reception of the handover execution request. As described above, the communication terminal 20 transmits the retransmission packets at a coding rate lower than a coding rate of the packets transmitted at the predetermined intervals.

At time $t_5$, the radio terminal 10 detects that the amount of the packets stored in the buffer 15 reaches the second optimum packet amount. At time $t_5$, the radio terminal 10 resets the packet reproducing rate to the predetermined rate and restarts the AJB control. Here, time $t_5$ is the timing of receiving the last retransmission packet among the retransmission packets transmitted from the communication terminal 20.

(Example 2 of Packet Reproducing Rate Control)

Example 2 of controlling a packet reproducing rate according to the first embodiment is described below by referring to the drawings. FIG. 5 is a view showing Example 2 of controlling a packet reproducing rate according to the first embodiment. Here, a case where the radio terminal 10 is based on a SCoA (Single Care of Address) is shown as an example.

The radio terminal 10 transmits a handover preparation request to the home agent 30 at time $t_1$. That is, at time $t_1$, the first logical expression is satisfied. At time $t_1$, the radio terminal 10 changes the packet reproducing rate to a higher (faster) rate than the predetermined rate. In addition, at time $t_1$, the radio terminal 10 stops the AJB control.

The radio terminal 10 transmits a handover execution request to the home agent 30 at time $t_2$. That is, at time $t_2$, the second logical expression is satisfied. It should be noted that during a time period between time $t_1$ and time $t_2$, the amount of the packets stored in the buffer 15 is decreased since the packet reproducing rate is higher (faster) than the predetermined rate.

At time $t_3$, the radio terminal 10 detects that the amount of the packets stored in the buffer 15 reaches the predetermined amount (for example, the second optimum packet amount).

At time $t_3$, the radio terminal 10 resets the packet reproducing rate to the predetermined rate.

Here, the predetermined amount is calculated based on the delay time in the first network 100 and the delay time in the second network 200. For example, the predetermined amount is determined so that the packets stored in the buffer 15 would not be exhausted.

It should be noted that during a time period between time $t_2$ and time the amount of the packets stored in the buffer 15 is further decreased, since the packet reproducing rate is higher (faster) than the predetermined rate and the packets are discarded in the radio terminal 10.

Here, in a period during which the radio terminal 10 cannot receive the packets from the communication terminal 20 (hereinafter, gap period), it is preferable that the packets stored in the buffer 15 should not be exhausted. The gap period is calculated by "Dnew_dn+Dnew_up." The increase range of the packet reproducing rate are determined so that the packets stored in the buffer 15 would not be exhausted during the gap period.

At time $t_4$, the radio terminal 10 receives a completion notification of the handover from the home agent 30. The radio terminal 10 changes again the packet reproducing rate to be a higher (faster) rate than the predetermined rate in response to the reception of the completion notification of the handover. During a time period between time $t_4$ and time $t_5$, the radio terminal 10 receives the retransmission packets at intervals shorter than the predetermined interval through the second network 200.

In other words, the communication terminal 20 transmits the retransmission packets at intervals shorter than the predetermined interval, through the second network 200, in response to reception of the handover execution request. As described above, the communication terminal 20 transmits the retransmission packets at a coding rate lower than a coding rate of the packets to be transmitted at the predetermined intervals.

At time $t_5$, the radio terminal 10 detects that the amount of the packets stored in the buffer 15 reaches the second optimum packet amount. At time $t_5$, the radio terminal 10 resets the packet reproducing rate to the predetermined rate and restarts the AJB control.

(Example 3 of Packet Reproducing Rate Control)

Example 3 of controlling a packet reproducing rate according to the first embodiment is described below by referring to the drawings. FIG. 6 is a view showing Example 3 of controlling a packet reproducing rate according to the first embodiment. Here, a case where the radio terminal 10 is based on MCoA (Multi Care of Address) is shown as an example. In the MCoA, the radio terminal 10 receives packets through both the first network 100 and the second network 200.

The radio terminal 10 transmits a handover preparation request to the home agent 30 at time $t_1$. That is, at time $t_1$, the first logical expression is satisfied. At time $t_1$, the radio terminal 10 changes the packet reproducing rate to a higher (faster) rate than the predetermined rate. In addition, at time $t_1$, the radio terminal 10 stops the AJB control.

The radio terminal 10 transmits a handover execution request to the home agent 30 at time $t_2$. That is, at time $t_2$, the second logical expression is satisfied. It should be noted that during a time period between time $t_1$ and time $t_2$, the amount of the packets stored in the buffer 15 is decreased since the packet reproducing rate is higher (faster) than the predetermined rate.

At time $t_3$, the radio terminal 10 detects that the amount of the packets stored in the buffer 15 reaches a predetermined amount. At time $t_3$, the radio terminal 10 resets the packet reproducing rate to the predetermined rate. It should be noted that during a time period between time $t_2$ and time $t_3$, the amount of the packets stored in the buffer 15 is further decreased, since the packet reproducing rate is higher (faster) than the predetermined rate.

Here, the predetermined amount is calculated based on the delay time in the first network 100 and the delay time in the second network 200. For example, the predetermined amount is calculated so that the amount of the packets stored in the buffer 15 would be the second optimum packet amount at the timing (time $t_5$) of receiving the last retransmission packet among the retransmission packets received through the first network 100.

It should be noted that a gap period is generated in Example 1 of the packet reproducing rate control as described above, whereas a gap period is not generated in Example 3 of the packet reproducing rate control.

At time $t_4$, the radio terminal 10 receives a completion notification of the handover from the home agent 30.

At time $t_5$, the radio terminal 10 detects that the amount of the packets stored in the buffer 15 reaches the second optimum packet amount. At time $t_5$, the radio terminal 10 resets the packet reproducing rate to the predetermined rate and restarts the AJB control. Here, time $t_5$ is the timing of receiving the last packet among the packets received through the first network 100.

(Operation of Communication System)

In the following description, an operation of the communication system according to the first embodiment is described by referring to the drawings. FIG. 7 is a sequential diagram showing the operation of the communication system according to the first embodiment.

As shown in FIG. 7, at step S10, the application processor 16 notifies the MIH user 14 of the quality of service (QoS Requirement) required for a new application.

In step S11, the MIH user 14 notifies the MIH functioning unit 13 of a threshold setting request (MIH_Configure.request) to request the setting of thresholds of radio parameters to be monitored in the radio link set up with the first network 100.

In step 12, in response to the threshold setting request (MIH_Configure.request), the MIH functioning unit 13 notifies the link controller 12A of a condition setting request (Link_Configure_Threshold.request) to request the setting of a condition for the handover from the first network 100 to the second network 200.

The condition setting request (Link_Configure_Threshold.request) includes at least a condition (first condition) for executing the handover preparation request (Initiation Action) and a condition (second condition) for executing the handover execution request (Execute Action).

In step S13, the link controller 12A notifies the MIH functioning unit 13 of Link_Configure.Threshold.confirm which indicates that the setting of the conditions is completed.

In step S14, the MIH functioning unit 13 notifies the MIH user 14 of MIH_Configure.confirm which indicates that the setting of the so threshold is completed.

In step S15, the link controller 12A monitors whether or not the radio parameter values in the radio link set up with the first network 100 are deteriorated in comparison with the first threshold designated by the MIH functioning unit 13. Subsequently, the link controller 12A determines whether or not the radio parameter values satisfy the first logical expression. Here, the description is continued on the assumption that the first logical expression is satisfied.

In step S16, the link controller 12A notifies the MIH functioning unit 13 of Link_Parameters_Report.indication which indicates radio parameter values in the radio link set up with the first network 100.

Specifically, Link_Parameters_Report.indication includes old radio parameter values, new radio parameter values, the type of operation, and a logical expression.

The old radio parameter values are values which are notified the last time to the MIH functioning unit 13 and the new radio parameter values are values which are notified this time to the MIH functioning unit 13. The type of operation is information indicating the handover preparation request (Initiation Action) or the handover execution request (Execute Action). The logical expression is information indicating the first logical expression (first condition for Initiation Action) or the second logical expression (second condition for Execute Action).

In step S16, the handover preparation request (Initiation Action) is set as the type of operation and the first logical expression (first condition for Initiation Action) is set as the logical expression.

In step S17, the MIH functioning unit 13 notifies the MIH user 14 of MIH_Link_Parameters_Report.indication which indicates radio parameter values in the radio link set up with the first network 100.

In step S18, the MIH user 14 notifies the MIH functioning unit of MIH_Handover_Prepare.request to request the handover preparation request (Initiation Action).

In step S19, the MIH functioning unit 13 notifies the link controller 12B of Link_Up.Request to request the setting up of the radio link with the second network 200.

In step S20, the link controller 12B sets up the radio link with the second network 200. As a matter of course, the radio communication unit 11B sets up the physical radio connection with the second network 200 before setting the radio link.

In step S21, the link controller 12B notifies the MIH functioning unit 13 of Link_Up.indication which indicates that the radio link is set up with the second network 200.

In step S22, the MIH functioning unit 13 notifies the MIH user of MIH_Handover_Prepare.confirm which indicates that the handover preparation request (Initiation Action) is completed.

In step S23, the MIH user 14 transmits the handover preparation request (Initiation Action) to the home agent 30. The home agent 30 transmits the handover preparation request to the communication terminal 20 (corresponding node).

In step S24, the MIH user 14 notifies the application processor 16 of the handover preparation confirmation indicating that the handover preparation request is transmitted.

In step S25, the application processor 16 transmits information indicating the delay times of the first network 100 and the second network 200 (Delay and Jitter Information Indication) to the communication terminal 20. The application processor 16 may notify the communication terminal 20 of the amount (the number) of retransmission packets corresponding to the packets (lost packets) that cannot be normally received by the radio terminal 10, by using the "Delay and Jitter Information Indication." The application processor 16 may notify the communication terminal 20 of the coding rate or transmission rate of the retransmission packets by using the "Delay and Jitter Information Indication."

In step S26, the communication terminal 20 calculates the amount (the number) of retransmission packets corresponding to packets (lost packets) that cannot be normally received by the radio terminal 10, based on the delay times of the first network 100 and the second network 200.

In step S27, the application processor 16 calculates the optimum packet amount (second optimum packet amount) in the second network 200 based on the delay time in the second network 200.

In step S28, the application processor 16 stops the AJB control.

In step S29, the application processor 16 changes the packet reproducing rate to a rate higher (faster) than the predetermined rate.

In step S30, the link controller 12A monitors whether or not the radio parameter values in the radio link set up with the first network 100 are deteriorated in comparison with the second thresholds designated by the MIH functioning unit 13. Subsequently, the link controller 12A determines whether or not each radio parameter value satisfies the second logical expression. Here, the description is continued on the assumption that the second logical expression is satisfied.

In step S31, the link controller 12A notifies the MIH functioning unit 13 of Link_Parameters_Report.indication which indicates radio parameter values in the radio link set up with the first network 100. Here, Link_Parameters_Report.indication is similar to the information which is transmitted in step S16.

It should be noted that in step S31, the handover execution request (Execute Action) is set as the type of operation and the second logical expression (second condition for Execute Action) is set as the logical expression.

In step S32, the MIH functioning unit 13 notifies the MIH user of MIH_Link_Parameters_Report.indication which indicates a radio parameter value in the radio link set up with the first network 100.

In step S33, the MIH user 14 transmits the handover execution request (Execute Action) to the home agent 30. The home agent 30 transmits the handover execution request to the communication terminal 20.

In step S34, the MIH user 14 notifies the application processor 16 of the handover execution request confirmation indicating that the handover execution request is transmitted.

In step S35, the MIH user 14 notifies the MIH functioning unit 13 of MIH_Switch as an instruction for the switching of the network to which the radio terminal 10 is connected.

In step S36, the MIH functioning unit 13 switches the network to which the radio terminal 10 is connected, from the first network 100 to the second network 200.

In step S37, the MIH functioning unit 13 notifies the MIH user 14 of MIH_Commit.request to confirm whether or not the handover is allowed to be completed.

In step S38, the home agent 30 transmits a completion notification of the handover, to the MIH user 14.

In step S39, the MIH user 14 notifies the MIH functioning unit 13 of MIH_Handover_Complete.request to request completion of the handover.

In step S40, the MIH functioning unit 13 notifies the link controller 12A of Link_Teardown.Request to request release of the radio link set up with the first network 100.

In step S41, the link controller 12A releases the radio link set up with the first network 100.

In step S42, the link controller 12A notifies the MIH functioning unit 13 of Link_Parameters Report.indication which indicates that the release of the radio link set up with the first network 100 is completed.

In step S43, the MIH functioning unit 13 notifies the MIH user 14 of MIH_Handover_Complete.response which indicates that the handover is completed.

In step S44, the MIH user 14 notifies the application processor 16 of the handover completion notification confirmation indicating that the handover completion notification is received.

In step S45, the communication terminal 20 transmits the retransmission packets corresponding to the lost packets to the radio terminal 10. It is preferable that the communication unit 20 transmits the retransmission packets at a coding rate lower than a coding rate of the packets transmitted at the predetermined intervals.

In step S46, the application processor 16 restarts the AJB control.

It should be noted that, as shown in Examples 1 to 3 of reproducing rate control, the application processor 16 properly controls the packet reproducing rate in a time period between step S28 and step S46.

(Operations and Effects)

In the first embodiment, the radio terminal 10 changes the packet reproducing rate to a rate higher than the predetermined rate in response to the transmission of the handover preparation request. Accordingly, after the handover from the first network 100 to the second network 200, the amount of packets stored in the buffer 15 can be quickly made close to the optimum packet amount (second optimum packet amount) in the second network 200. Thus, the real-time constraint of the packets can be improved.

In the first embodiment, in response to the transmission of the handover preparation request, the radio terminal 10 stops the AJB control. This makes it possible to prevent from sudden change of play and degradation of voice when the handover from the first network 100 to the second network 200 is executed.

Second Embodiment

A second embodiment of the present invention is described below by referring to the drawings. In the following description, differences between the first embodiment and the second embodiment are mainly described.

In the first embodiment, the flow of packets from the communication terminal 20 to the radio terminal 10 is mainly described. In contrast, in the second embodiment, the flow of packets from the radio terminal 10 to the communication terminal 20 is mainly described.

In other words, in the second embodiment, as compared with the first embodiment, the function of an application processor 16 of the radio terminal 10 and the function of an application processor 26 of the communication terminal 20 are replaced with each other. Specifically, the application processor 26 of the communication terminal 20 has a function of the application processor 16 according to the first embodiment. The application processor 16 of the communication terminal 10 has a function of the application processor 26 according to the first embodiment.

In the second embodiment, similar to the first embodiment, a delay time in the first network 100 is longer than a delay time in the second network 200. In the second embodiment, similar to the first embodiment, the radio terminal 10 executes handover from the first network 100 to the second network 200.

It should be noted here that the concept of the delay time in a network includes not only a time period in which a packet from the communication terminal 20 (corresponding node) stays in the network (stay time) but also variations of the stay time (jitter). The stay time has correlation with the jitter. In general, the longer the stay time is, the larger the jitter becomes.

(Examples of Packet Reproducing Rate Control)

In the following description, examples of controlling a packet reproducing rate are described by referring to FIGS. 8 to 10. In the following description, the delay time of the packets transmitted from the communication terminal 20 to the radio terminal 10 through the first network 100 is denoted by "Dold_dn." In addition, the delay time of the packets transmitted from the radio terminal 10 to the communication terminal 20 through the first network 100 is denoted by "Dold_Up." Similarly, the delay time of the packets transmitted from the communication terminal 20 to the radio terminal 10 through the second network 200 is denoted by "Dnew_dn", and the delay time of a packet to be transmitted from the radio terminal 10 to the communication terminal 20 through the second network 200 is denoted by "Dnew_up."

(Example 1 of Packet Reproducing Rate Control)

Example 1 of controlling a packet reproducing rate according to the second embodiment is described below by referring to the drawings. FIG. 8 is a view showing Example 1 of controlling a packet reproducing rate according to the second embodiment. Here, a case where the radio terminal 10 is based on a SCoA (Single Care of Address) is shown as an example. In the SCoA, the radio terminal 10 transmits packets through any one of the first network 100 and the second network 200.

At time $t_1$, the communication terminal 20 receives a handover preparation request from the home agent 30. At time $t_1$, the communication terminal 20 changes the packet reproducing rate to a rate higher (faster) than a predetermined rate. In addition, at time $t_1$, the communication terminal 20 stops the AJB control.

At time $t_2$, the communication terminal 20 receives a handover execution request from the home agent 30. It should be noted that during a time period between time $t_1$ and time $t_2$, the amount of the packets stored in a buffer 25 is decreased, since the packet reproducing rate is higher (faster) than the predetermined rate.

At time $t_3$, the communication terminal 20 detects that the amount of packets stored in the buffer 25 reaches a predetermined amount. At time $t_3$, the communication terminal 20 resets the packet reproducing rate to the predetermined rate. It should be noted that during a time period between time $t_2$ and time $t_3$, the amount of the packets stored in the buffer 25 is further decreased, since the packet reproducing rate is higher (faster) than the predetermined rate and the packets are discarded in the communication terminal 20. It should also be noted that time $t_3$ is a time before the timing of receiving the first packet among the packets (here, retransmission packet) to be received through the second network 200.

Here, the predetermined amount is calculated based on the delay time in the first network 100 and the delay time in the second network 200. For example, the predetermined amount is calculated based on the amount of the retransmission packets corresponding to the lost packets (discarded packets). The amount (the number) of the retransmission packets from the radio terminal 10 to the communication terminal 20 is calculated by "(Dold_up+Dnew_dn)/predetermined interval (frame period)." Specifically, the predetermined amount is calculated so that the amount of the packets stored in the buffer 25 would become the second optimum packet amount at the timing (time $t_4$) of receiving the last retransmission packet among the retransmission packets transmitted from the radio terminal 10.

Here, in a period during which the communication terminal 20 cannot receive the packets from the radio terminal 10 (hereinafter, gap period), it is preferable that the packets stored in the buffer 25 should not be exhausted. The gap period is calculated by "Dnew_up+Dnew_dn." The predetermined amount and the increase range of the packet reproducing rate are determined so that the packets stored in the buffer 25 would not be exhausted during the gap period.

During a time period between time $t_3$ and time $t_4$, the communication terminal 20 receives the retransmission packets at intervals shorter than the predetermined interval through the second network 200.

In other words, the radio terminal 10 transmits the retransmission packets at intervals shorter than the predetermined interval through the second network 200, in response to reception of the handover completion notification. The radio terminal 10 transmits the retransmission packets at a coding rate lower than a coding rate of the packets transmitted at the predetermined intervals.

At time $t_4$, the communication terminal 20 detects that the amount of the packets stored in the buffer 25 reaches the second optimum packet amount. At time $t_4$, the communication terminal 20 resets the packet reproducing rate to the predetermined rate and restarts the AJB control. Here, time $t_4$ is the timing of receiving the last retransmission packet among the retransmission packets transmitted from the radio terminal 10.

(Example 2 of Packet Reproducing Rate Control)

Example 2 of controlling a packet reproducing rate according to the second embodiment is described below by referring to the drawings. FIG. 9 is a view showing Example 2 of controlling a packet reproducing rate according to the second embodiment. Here, a case where the radio terminal 10 is based on a SCoA (Single Care of Address) is shown as an example.

At time $t_1$, the communication terminal 20 receives the handover preparation request from the home agent 30. At time $t_1$, the communication terminal 20 changes the packet reproducing rate to a higher (faster) rate than the predetermined rate. In addition, at time $t_1$, the communication terminal 20 stops the AJB control.

At time $t_2$, the communication terminal 20 receives the handover execution request from the home agent 30. It should be noted that, during a time period between time $t_1$ and time $t_2$, the amount of the packets stored in the buffer 25 is decreased, since the packet reproducing rate is higher (faster) than the predetermined rate.

At time $t_3$, the communication terminal 20 detects that the amount of the packets stored in the buffer 25 reaches the predetermined amount (for example, the second optimum packet amount). At time $t_3$, the communication terminal 20 resets the packet reproducing rate to the predetermined rate. Here, the predetermined amount is calculated based on the delay time in the first network 100 and the delay time in the second network 200. For example, the predetermined amount is determined so that the packets stored in the buffer 25 would not be exhausted.

It should be noted that, during a time period between time $t_2$ and time $t_3$, the amount of the packets stored in the buffer 25 is further decreased, since the packet reproducing rate is higher (faster) than the predetermined rate and the packets are discarded in the communication terminal 20. It should also be noted that time $t_3$ is a time before the timing of receiving the first packet among the packets (here, retransmission packet) to be received through the second network 200.

Here, in a period during which the communication terminal 20 cannot receive the packets from the radio terminal 10 (hereinafter, gap period), it is preferable that the packets stored in the buffer 25 should not be exhausted. The gap period is calculated by "Dnew_up+Dnew_dn." The increase range of the packet reproducing rate are determined so that the packets stored in the buffer 25 would not be exhausted during the gap period.

At time $t_4$, the communication terminal 20 receives the first packet among the packets (here, retransmission packet) to be received through the second terminal 200. Upon receipt of the first packet, the communication terminal 20 changes the packet reproducing rate again to a higher (faster) rate than the predetermined rate.

During a time period between time $t_4$ and time $t_5$, the communication terminal 20 receives the retransmission packets at intervals shorter than the predetermined interval through the second network 200.

In other words, in response to reception of the handover completion notification, the radio terminal 10 transmits the retransmission packets at intervals shorter than the predetermined interval through the second network 200. The radio terminal 10 transmits the retransmission packets at a coding rate lower than a coding rate of the packets to be transmitted at the predetermined intervals.

At time $t_5$, the communication terminal 20 detects that the amount of the packets stored in the buffer 25 reaches the second optimum packet amount. At time $t_5$, the communication terminal 20 also resets the packet reproducing rate to the predetermined rate and restarts the AJB control.

(Example 3 of Packet Reproducing Rate Control)

Example 3 of controlling a packet reproducing rate according to the second embodiment is described below by referring to the drawings. FIG. 10 is a view showing Example 3 of controlling a packet reproducing rate according to the second embodiment. Here, a case where the radio terminal 10 is based on MCoA (Multi Care of Address) is shown as an example. In the MCoA, the radio terminal 10 transmits packets through both the first network 100 and the second network 200.

At time $t_1$, the communication terminal 20 receives the handover preparation request from the home agent 30. At time $t_1$, the communication terminal 20 changes the packet reproducing rate to a higher (faster) rate than the predetermined rate. In addition, at time $t_1$, the communication terminal 20 stops the AJB control.

At time $t_2$, the communication terminal 20 receives the handover execution request from the home agent 30. It should be noted that, during a time period between time $t_1$ and time $t_2$, the amount of the packets stored in the buffer 25 is decreased, since the packet reproducing rate is higher (faster) than the predetermined rate.

At time $t_3$, the communication terminal 20 detects that the amount of the packets stored in the buffer 25 reaches a predetermined amount. At time $t_3$, the communication terminal 20 resets the packet reproducing rate to the predetermined rate. It should be noted that, during a time period between time $t_2$ and time $t_3$, the amount of the packets stored in the buffer 25 is further decreased, since the packet reproducing rate is higher (faster) than the predetermined rate.

Here, the predetermined amount is calculated based on the delay time in the first network 100 and the delay time in the second network 200. For example, the predetermined amount is calculated so that the amount of the packets stored in the buffer 25 would become the second optimum packet amount at the timing (time $t_4$) of receiving the last retransmission packet among the retransmission packets received through the first network 100.

It should be noted that the gap period is generated in Example 1 of the packet reproducing rate control as described above, whereas a gap period is not generated in Example 3 of the packet reproducing rate control.

At time $t_4$, the communication terminal 20 detects that the amount of the packets stored in the buffer 25 reaches the second optimum packet amount. At time $t_4$, the communication terminal 20 resets the packet reproducing rate to the predetermined rate and restarts the AJB control. Here, time $t_4$ is the timing of receiving the last retransmission packet among the retransmission packets transmitted from the radio terminal 10.

(Operation of Communication System)

In the following description, an operation of the communication system according to the second embodiment is described by referring to the drawings. FIG. 11 is a sequential diagram showing the operation of the communication system according to the second embodiment. In FIG. 11, similar step numbers are given to denote processes similar to those of FIG. 7. The description of the processes similar to those of FIG. 7 is omitted here.

In the second embodiment, as shown in FIG. 11, processes in steps 26A to 29A, step S45A, and step S46A are executed in place of steps S26 to S29, step S45, and S46 shown in FIG. 7.

In step 26A, the application processor 16 calculates the amount of the retransmission packets corresponding to packets (lost packets) that cannot be normally received by the communication terminal 20, based on the delay times of the first network 100 and the second network 200.

In step S27A, the communication terminal 20 (corresponding node) calculates the optimum packet amount (second optimum packet amount) in the second network 200 based on the delay time in the second network 200.

In step S28A, the communication terminal 20 stops the AJB control.

In step S29A, the communication terminal 20 changes the packet reproducing rate to a rate higher than the predetermined rate.

In step S45A, the application processor 16 transmits the retransmission packets corresponding to the lost packets to the communication terminal 20. It is preferable that the application processor 16 transmit the retransmission packets at a coding rate lower than a coding rate of the packets transmitted at the predetermined intervals.

In step S46A, the communication terminal 20 restarts the AJB control.

It should be noted that the communication terminal 20 properly controls the packet reproducing rate during a time period between steps S28A to step S46A, as shown in Examples 1 to 3 of reproducing rate control.

(Operations and Effects)

In the second embodiment, the communication terminal 20 changes the packet reproducing rate to a rate higher than the predetermined rate in response to the reception of the handover preparation request. Accordingly, after the handover of the radio terminal 10 is executed from the first network 100 to the second network 200, the amount of packets stored in the buffer 25 can be quickly made close to the optimum packet amount (second optimum packet amount) in the second network 200. Consequently, the real-time constraint of the packets can be improved.

In the second embodiment, in response to the reception of the handover preparation request, the communication terminal 20 stops the AJB control. This makes it possible to suppress the rapid change in the packet transmission rate caused by the AJB control when the handover from the first network 100 to the second network 200 is executed.

Other Embodiments

As described above, the contents of the present invention have been disclosed through one embodiment of the invention. However, it should not be understood that the description and drawings which constitute one part of this disclosure limit the invention. From this disclosure, various alternative embodiments are apparent to a person skilled in the art.

For example, the operation of the radio terminal 10 can be provided as a computer executable program. Similarly, the operation of the communication terminal 20 can be provided as a computer executable program.

Although it is not particularly mentioned in the above-described embodiments, the delay times of the first network 100 and the second network 200 may be known to the radio terminal 10. In addition, the delay times of the first network 100 and the second network 200 may be measured by the radio terminal 10.

In the above-described embodiments, the description has been given of the case of the handover from the network having a long delay time to the network having a short delay time. However, the present embodiment is not limited to this.

For example, the present invention can be applied to the handover from the network having a short delay time to the network having a long delay time. Specifically, in such a case, the optimum packet amount has to be increased and thus, the interval of receiving packets becomes longer. Accordingly, in response to the start of the handover preparation request, the packet reproducing rate may be changed to a lower (slower) rate than the predetermined rate. Moreover, in response to the start of the handover preparation request, the AJB control may be stopped. Consequently, the amount of the packets stored in the buffer can be quickly made close to the optimum packet amount in a destination network of the handover. In addition, the exhaustion of the packets stored in the buffer can be suppressed.

What is claimed is:

1. A radio terminal communicates with a communication terminal through a first network or a second network having a delay time shorter than a delay time in the first network, the radio terminal comprising:
   a receiver configured to receive packets at predetermined intervals through the first network or the second network;
   a buffer configured to temporarily store the packets received by the receiver;
   a transmitter configured to transmit a preparation request for handover from the first network to the second network; and
   a reproducing unit configured to reproduce the packets stored in the buffer at a predetermined rate determined according to the predetermined intervals, wherein
   the reproducing unit executes an adaptive buffer control for adjusting a packet reproducing rate so that an amount of the packets stored in the buffer is maintained at an optimum packet amount, wherein the optimum packet amount is determined according to the delay time in the first or second network, and
   the reproducing unit stops the adaptive buffer control in response to a transmission of the preparation request by the transmitter, wherein the reproducing unit decreases the amount of the packets stored in the buffer by changing the packet reproducing rate to a rate higher than the predetermined rate in response to the transmission of the preparation request by the transmitter and the receiver receives a completion notification of the handover from the first network to the second network, and wherein the reproducing unit resets the packet reproducing rate to the predetermined rate when the amount of the packets stored in the buffer reaches a predetermined amount before a reception of the completion notification by the receiver.

2. The radio terminal according to claim 1, wherein
   the receiver receives a completion notification of the handover from the first network to the second network, and
   the reproducing unit restarts the adaptive buffer control when the amount of the packets stored in the buffer reaches the optimum packet amount in the second network after a reception of the completion notification by the receiver.

3. The radio terminal according to claim 1, wherein
   the receiver receives a completion notification of the handover from the first network to the second network,
   the reproducing unit resets the packet reproducing rate to the predetermined rate when the amount of the packets stored in the buffer reaches a predetermined amount before a reception of the completion notification by the receiver, and
   the reproducing unit changes again the packet reproducing rate to a rate higher than the predetermined rate in response to the reception of the completion notification by the receiver.

4. The radio terminal according to claim 1, wherein the predetermined amount is calculated based on the delay time in the first network and the delay time in the second network.

5. The radio terminal according to claim 3, wherein the predetermined amount is calculated based on the delay time in the first network and the delay time in the second network.

6. A communication terminal communicates with a radio terminal through a first network or a second network having a delay time shorter than a delay time in the first network, the communication terminal comprising:
   a receiver configured to receive packets from the radio terminal at predetermined intervals;
   a buffer configured to temporarily store the packets received by the receiver; and
   a reproducing unit configured to reproduce the packets stored in the buffer at a predetermined rate determined according to the predetermined intervals, wherein
   the receiver receives a preparation request from the radio terminal for handover from the first network to the second network,
   the reproducing unit executes an adaptive buffer control for adjusting a packet reproducing rate so that an amount of the packets stored in the buffer is maintained at an optimum packet amount, wherein the optimum packet amount is determined according to the delay time in the first or second network, and
   the reproducing unit stops the adaptive buffer control in response to a reception of the preparation request by the receiver, wherein the reproducing unit decreases the amount of the packets stored in the buffer by changing the packet reproducing rate to a rate higher than the predetermined rate in response to the reception of the preparation request by the receiver and resets the packet reproducing rate to the predetermined rate when the amount of the packets stored in the buffer reaches a predetermined amount before a reception of a first packet among packets received through the second network by the receiver.

7. The communication terminal according to claim 6, wherein
   the receiver receives an execution request for the handover from the radio terminal, and
   the reproducing unit restarts the adaptive buffer control when the amount of the packets stored in the buffer reaches the optimum packet amount in the second network after the reception of a execution request by the receiver.

8. The communication terminal according to claim 6, wherein
the reproducing unit resets the packet reproducing rate to the predetermined rate when the amount of the packets stored in the buffer reaches a predetermined amount before a reception of a first packet among packets received through the second network by the receiver, and
the reproducing unit changes again the packet reproducing rate to a rate higher than the predetermined rate in response to the reception of the first packet by the receiver.

9. The communication terminal according to claim 6, wherein the predetermined amount is calculated based on the delay time in the first network and the delay time in the second network.

10. The communication terminal according to claim 8, wherein the predetermined amount is calculated based on the delay time in the first network and the delay time in the second network.

* * * * *